United States Patent
Hairston

(10) Patent No.: US 7,242,765 B2
(45) Date of Patent: Jul. 10, 2007

(54) HEADSET CELLULAR TELEPHONES

(76) Inventor: Tommy Lee Hairston, 109 Sunset Dr., Ringgold, GA (US) 30736

( * ) Notice: Subject to any disclaimer, the term of this patent is extended or adjusted under 35 U.S.C. 154(b) by 21 days.

(21) Appl. No.: 10/184,718

(22) Filed: Jun. 28, 2002

(65) Prior Publication Data

US 2004/0001588 A1 Jan. 1, 2004

(51) Int. Cl.
H04M 1/00 (2006.01)
H04M 9/00 (2006.01)
(52) U.S. Cl. .................... 379/419; 379/430; 455/575.2
(58) Field of Classification Search ............... 379/430, 379/419; 455/575.2, 563; 381/381, 373, 381/71.1, 186, 309
See application file for complete search history.

(56) References Cited

U.S. PATENT DOCUMENTS

| | | | |
|---|---|---|---|
| 3,889,190 A | 6/1975 | Palmer | |
| 3,916,312 A | 10/1975 | Campbell | |
| 4,484,029 A | 11/1984 | Kenney | |
| 4,529,057 A * | 7/1985 | Telford | ...................... 381/373 |
| 4,620,068 A | 10/1986 | Wieder | |
| 4,654,883 A | 3/1987 | Iwata | |
| 4,882,745 A | 11/1989 | Silver | |
| 4,930,148 A | 5/1990 | Lee | |
| 5,095,503 A | 3/1992 | Kowalski | |
| 5,101,504 A | 3/1992 | Lenz | |
| 5,113,428 A | 5/1992 | Fitzgerald | |
| 5,148,471 A * | 9/1992 | Metroka et al. | ............. 455/563 |
| 5,426,689 A | 6/1995 | Griffith et al. | |
| 5,586,176 A | 12/1996 | Peck | |
| 5,590,417 A | 12/1996 | Rydbeck | |
| 5,596,638 A | 1/1997 | Paterson et al. | |
| 5,651,056 A | 7/1997 | Eting et al. | |
| 5,675,658 A * | 10/1997 | Brittain | ...................... 381/71.1 |
| 5,771,438 A | 6/1998 | Palermo et al. | |
| 5,864,603 A | 1/1999 | Haavisto et al. | |
| 5,884,199 A | 3/1999 | Maki | |
| 5,926,532 A | 7/1999 | Peck | |
| 5,943,627 A | 8/1999 | Kim et al. | |
| 5,982,904 A | 11/1999 | Eghtesdadi et al. | |
| 5,983,100 A | 11/1999 | Johansson et al. | |
| 5,991,637 A * | 11/1999 | Mack et al. | ................. 455/563 |
| 5,991,645 A | 11/1999 | Yuen et al. | |
| 6,006,115 A | 12/1999 | Wingate | |
| 6,061,654 A | 5/2000 | Brown et al. | |
| 6,078,825 A | 6/2000 | Hahn et al. | |
| 6,138,027 A | 10/2000 | Huang | |
| 6,154,663 A | 11/2000 | Itamochi | |

(Continued)

FOREIGN PATENT DOCUMENTS

WO  WO 95/18490  * 7/1995

*Primary Examiner*—William J. Deane, Jr.
(74) *Attorney, Agent, or Firm*—Kilpatrick Stockton LLP

(57) ABSTRACT

Headset cellular phones which may be worn continually and use voice recognition/speech activation for dialing telephone numbers and controlling other aspects of operation. Cell phones according to the present invention can include a microphone and preferably include both internal and external speakers to allow the user to communicate unobtrusively, check voice mail and conduct other activities while at the same time being able to hear ambient noise in the environment. Voice recognition/speech command functionally may also be used to generate and send touch tone or DTMF tones such as in response to call trees or voice recognition/speech activation functionality used by airlines, credit card companies, voice mail systems, and other applications.

10 Claims, 6 Drawing Sheets

U.S. PATENT DOCUMENTS

| | | |
|---|---|---|
| 6,198,947 B1 | 3/2001 | Barber |
| 6,212,408 B1 | 4/2001 | Son et al. |
| 6,212,409 B1 | 4/2001 | Matsuo et al. |
| 6,230,029 B1 | 5/2001 | Hahn et al. |
| 6,240,303 B1 | 5/2001 | Katzur |
| 6,269,259 B1 | 7/2001 | Lai |
| 6,272,361 B1 | 8/2001 | Courtis et al. |
| 6,298,249 B1 | 10/2001 | Locarno et al. |
| 6,301,487 B1 | 10/2001 | Nakamura |
| 6,339,706 B1 | 1/2002 | Tillgren et al. |
| 6,349,222 B1 | 2/2002 | Hafiz |
| 6,351,629 B1 | 2/2002 | Alschul et al. |
| 6,373,942 B1* | 4/2002 | Braund ............ 379/430 |
| 6,377,820 B1* | 4/2002 | Courtis et al. ............ 455/563 |
| 6,510,325 B1* | 1/2003 | Mack et al. ............ 455/575.2 |
| 6,690,808 B2* | 2/2004 | Urwyler ............ 381/381 |
| 2001/0046304 A1* | 11/2001 | Rast |
| 2002/0013784 A1* | 1/2002 | Swanson |
| 2003/0013483 A1* | 1/2003 | Ausems et al. |
| 2003/0059071 A1* | 3/2003 | Dunham ............ 381/309 |

* cited by examiner

HEADSET CELLULAR TELEPHONES

The present invention relates to various structures and designs for head-mounted cellular telephones and other head-mounted devices which operate via air interfaces.

BACKGROUND AND SUMMARY

Cellular telephones and other radio frequency (RF) messaging, personal digital assistance, and other organizational and communication devices which use the airwaves, whether via satellite or terrestrial propagation (hereinafter for purposes of disclosure, but not in a limiting fashion "cell phones") are ubiquitous. However, most of these devices are hand-held and thus constrain the user from performing other tasks as effectively as possible when in use. For example, persons who are operating an automobile while at the same time planting a cell phone against the ear with one hand can compromise their effectiveness and performance behind the wheel. Those who wish to take notes or be free to use both hands for other things are similarly compromised. Various devices according to the present invention address such issues.

Cell phone users are often perceived as loud and conspicuous perhaps not as much because of their nature or character, but because of the way cell phone instrument must be used. Ring tones in public places, need to talk and hear over ambient noise, difficulty in knowing whether the ringing cell phone is yours or another's, breakage from dropping, difficulty in removing from the belt and hitting the keys unlock combination are some of the issues. Additionally, cell phones with cables for the earpiece can snag on objects that break the wire, extract the plug from the phone or otherwise exasperate the user. Additionally, buttons and keys can be pressed inadvertently and in any event are often difficult to press correctly without missed cues. Lack of clarity in communication caused by the microphone being distant from the mouth is another issue which calls for improvement.

Cell phones according to the present invention fit on the head using various structures, and they contain other features such as voice recognition/voice activated dialing and operation which free the user from distraction, the need to use hands, and other physical constraints. Thus, operating heavy equipment using a headset cell phone according to the present invention could be safer than doing while using one hand to cradle a conventional cellphone against the ear. Moreover, operating a vehicle while talking to another on a cell phone according to the present invention could actually be safer than driving a vehicle while carrying on a conversation with another passenger, since the headset cell phone does not require head movement or physical gestures. Similarly, such headsets are in some ways safer than speaker phones in cars, because the driver is no longer inclined to incline the head toward the speaker in order to avoid ambient noise or conversation. Furthermore, a conventional handset cell phone in the car is easily misplaced and in any event distracts the driver from the road to locate and dial it. From a safety point of view, a hands-free headset is easier to use in an emergency context, particularly if the driver is injured or is otherwise in extremis.

One feature which enables complete headset operation without tactile intervention or manipulation is the use of voice recognition and speech activation. Such functionality typically includes computing capacity connected to a transducer such as a microphone/speaker, and digitizes and compares incoming sounds against a table or database of digitized sound files in order to identify or draw inferences about what is being said and to act on it. For instance, cell phones according to the present invention can "hear" a spoken telephone number and dial the number, can hear the command "on" and activate, can hear the command "2" in response to a call tree and send the dtmf tone combination corresponding to the numeral "2" on a conventional keypad. Accordingly, cell phones according to the present invention do not need keypads or other buttons, or displays, although they may certainly be included if desired.

Thus, tending in the direction of simplicity in men-machine interface design, headset cell phones according to present invention need contain minimal or no tactile interfaces, such as buttons or switches. Instead, voice activation and speech recognition can control all phases of operation. Control of off-hook/on-hook state, dialing of numbers, programming of speed-dial numbers, and other functions can occur using larger or smaller sets of voice commands which can be learned by software in cell phones according to the present invention. Such commands can be processed and implemented using conventional speech recognition and voice activation techniques, including those used in certain vehicular-based cell phone applications currently.

From another point of view, quietness is an advantage of headset cell phones according to the present invention. For example, a call may be answered or a ring tone may be heard permitting the user to answer with a virtually silent tone in the ear that cannot be heard by others in the vicinity such as in a meeting. The user may then leave the room or very quietly answer or communicate. Tones, rings, caller i.d., voicemail and other cues or information can be heard through an internal speaker while not disturbing others nearby.

In another aspect, the headset cell phones can be beneficial to those who have circulatory problems which prevent or hinder their ability to hold the handset on the ear for extended periods of time. In addition, those with medical conditions which inhibit mobility can also potentially communicate more quickly and more effectively without the need for manual intervention to do so.

According to various embodiments of the present invention, headset cell phones can have a special design earpiece with a private internal speaker for telephone conversations. The devices can also contain an external speaker for ring tone and open conversation so that if a telephone call can, for example, be answered or a command given while the cell phone is sitting on a base charger. The base can serve not only as a battery recharger, but also can serve as the base unit for a wireless home phone functionality in headset cell phones according to this invention. The cell phone can also contain, in the earpiece, for example, a porthole which allows sounds external to the telephone to be heard by the wearer. The porthole can be adapted to be opened and closed by voice command.

A microphone can extend via a boom from the headset, and the boom can contain a switch which can control various operations. For example, retracting the boom can correspond to off state, fully extended to on for conversation, and mid-retraction for programming and other functions. Alternatively, commands can be given by voice to effect or invoke any of these functions.

A base unit can allow the cell phone to operate also as a wireless home telephone such as by incorporating two addresses or numbers in the headset cell phone. One number can be a cell phone number and the other an extension on a home wireless network or system so that the headset cell phone is capable of both cellular and "landline" operation.

For example, at home the user allows the headset cell phone to communicate with the base which communicates with the public network wire line or in conventional fashion. When the user moves out of range of the home base unit, or when a command is given, the headset cell phone can transition to communicating within the cellular telephone network rather than with the base unit. Similarly, in a business context, the base unit could allow business people to be directly accessible even though not at their desks but other places in the office.

Various embodiments of headset cell phones according to the present invention can be structured in several ways to achieve the purposes of the invention. A body position adjacent an internal earpiece and, if desired, an external earpiece and a port, can contain cell phone electronics and processing and memory capacity for carrying out voice recognition and speech activation functionality. From the body can extend a microphone boom if desired which can, if desired, function as a switch to allow the user to control off-hook, on-hook, and programming states as well as an on/off state if desired. (As mentioned above, any of these can be implemented using voice recognition/speech activation as desired). A strap or positioner can extend across the top of head, around the back of the head, down the neck and around the shoulders, or omitted if desired. The strap can contain an antenna which increases, as desired, gain in signal strength as sensed by receiver circuitry in the cell phone electronics. The body can fit with a base which can act as a charger and also, as mentioned above, as a base unit for home wireless operation. The cell phone can also operate with a first-based unit at home, a second-based unit at the office, and as otherwise desired. It can contain other communications circuitry such as "blue tooth" or IEEE 803.11 to allow data and/or voice communications with other networks and devices.

Such hands-free headset cell phones according to the present invention can be useful for government agencies because of the hands-free benefits and also quietness and privacy. For example, a police officer stopping a suspicious vehicle need approach the vehicle only once without the need to leave and then risk the danger of a second approach in order to investigate the driver on a computer in the patrol car. Quietness and other auditory functionality can also help in an emergency context by keeping the noise level low and promoting a calmer environment. Similarly, headset cell phones according to present invention promotes safety in cab, truck and delivery company fleets by helping maintain the drivers' attention on the road while allowing them to communicate with the dispatchers more effortlessly. In a similar vein, doctors, nurses and other professionals can obtain information without the need to interrupt their work or distract themselves from using both hands on the patient.

Another aspect of headset cell phones according to the present invention is use with a geographical locator including GPS functionality. This functionality can be used in a reporting fashion to allow wearers to be tracked such as in a truck fleet, hiking, accident or avalanche context.

These and other advantages, features, and objects of the present invention will become apparent with respect to the remainder of this document.

BRIEF DESCRIPTION

DETAILED DESCRIPTION

Figure 1:
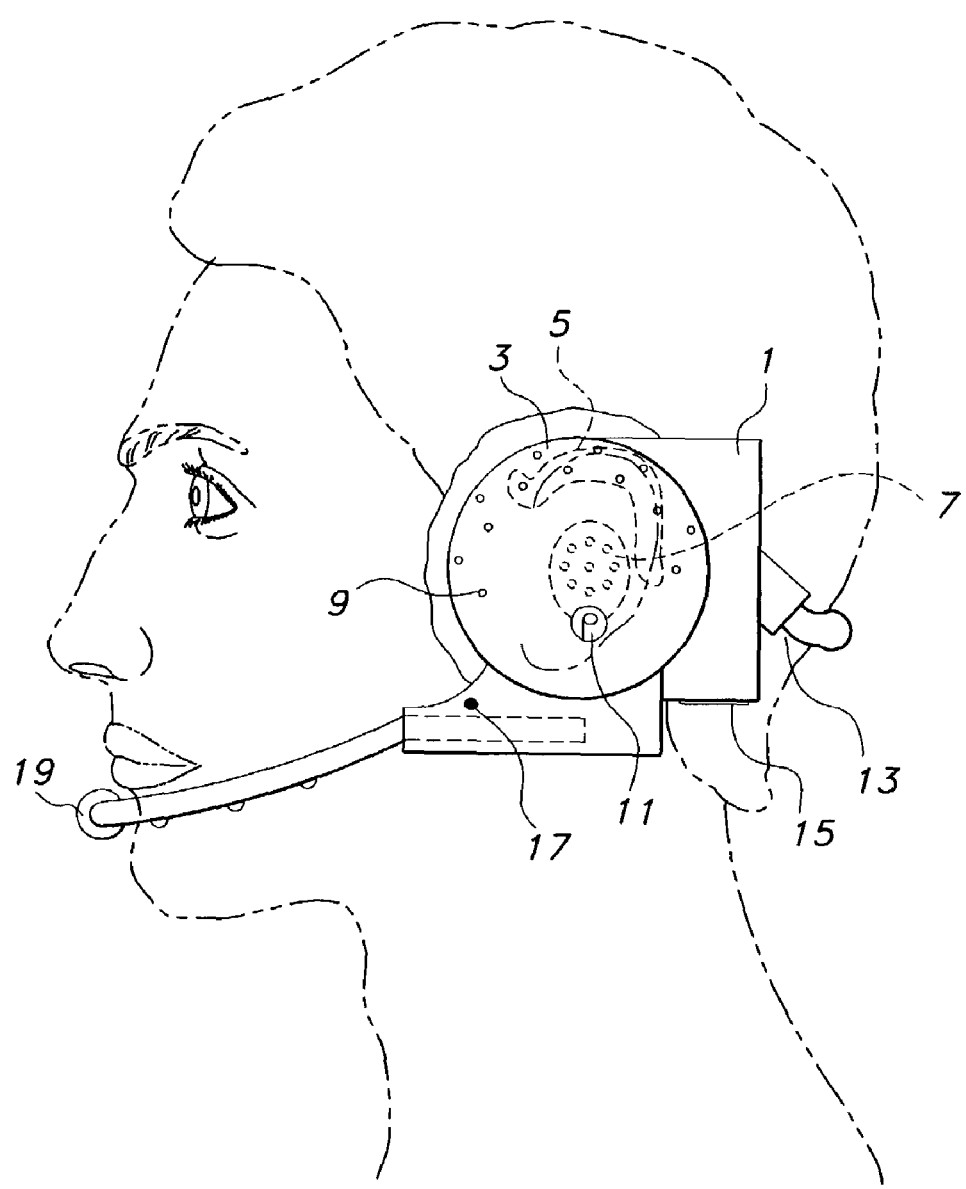
FIG. 1 is a perspective view showing a headset cell phone according to a first embodiment of the present invention.

FIG. 1 shows a headset cell phone according to a first embodiment of the present invention. Body 1 contains cell phone electronics, batteries supply, processing power, speech voice recognition/speech activation functionality and other electronics and functionally as desired. These may be as shown schematically in FIG. 6. Such circuitry and functionality may be conventional or as developed in the future.

Body 1 may be connected to or include an earpiece or speaker 3. Earpiece 3 may include structure 5 for connection to part of the ear anatomy in order to support the headset at least partially. The structure 5 may be formed of any desired material and connected to body 1 and/or earpiece 3 as desired.

Earpiece 3 can contain an internal speaker 7 for delivering sound to the user's ear. Internal speaker 7 may be a conventional cell phone speaker or other small loud speaker. The cell phone may also contain an external speaker 9 which may be larger and can receive and send sound signals to allow the user to hear ambient noise, to allow the user to communicate with the cell phone when it is off the user's head such as on a base unit or as otherwise desired. This speaker may be a conventional loud speaker or as otherwise desired.

A port 11 which can be manually opened and closed, or can be opened and closed by voice activation allows the ear to hear through an opening in the earpiece 3 or body 1 or otherwise through the headset.

A support structure 13 such as a bendable, non-bendable, extendable, non-extendable or otherwise structured and configured head strap 13 can extend from the body 1 and/or earpiece 3 to help secure the headset to the head. The strap 13 can contain an antenna element in order to enhance receiver gain, directionality or for other purposes. In the embodiment shown in FIG. 1, the strap 13 spans the occipital area of the head for minimum obtrusiveness with maximum support.

The charger connection 15 can be found on the body 1 with any desired pin and/or for other electrical interface for power, interface with a base unit or auxiliary components such as GPS unit or other devices.

A microphone support 17 can extend from the body 1 and/or earpiece 3 in an adjustable fashion to position microphone 19 near the user's mouth. Similarly, a microphone can be positioned on the earpiece 3, body 1 or as otherwise desired to receive sound waves through the air or the user's anatomy without the need for a microphone support 17. The support 17 can also contain a switch for on/off functionality and programming state control, and any other desired control, when such control is desired to be implemented by a physical switching rather than voice interface.

Operation of internal speaker 7, external speaker 9, port hole 11, various switching states such as off hook, on hook and programming, together with programming commands, can all be executed using voice recognition/speech activation techniques. Such control and programming may occur while the cell phone is on the user or while it is in a base for charging or other purposes.

Figure 2:
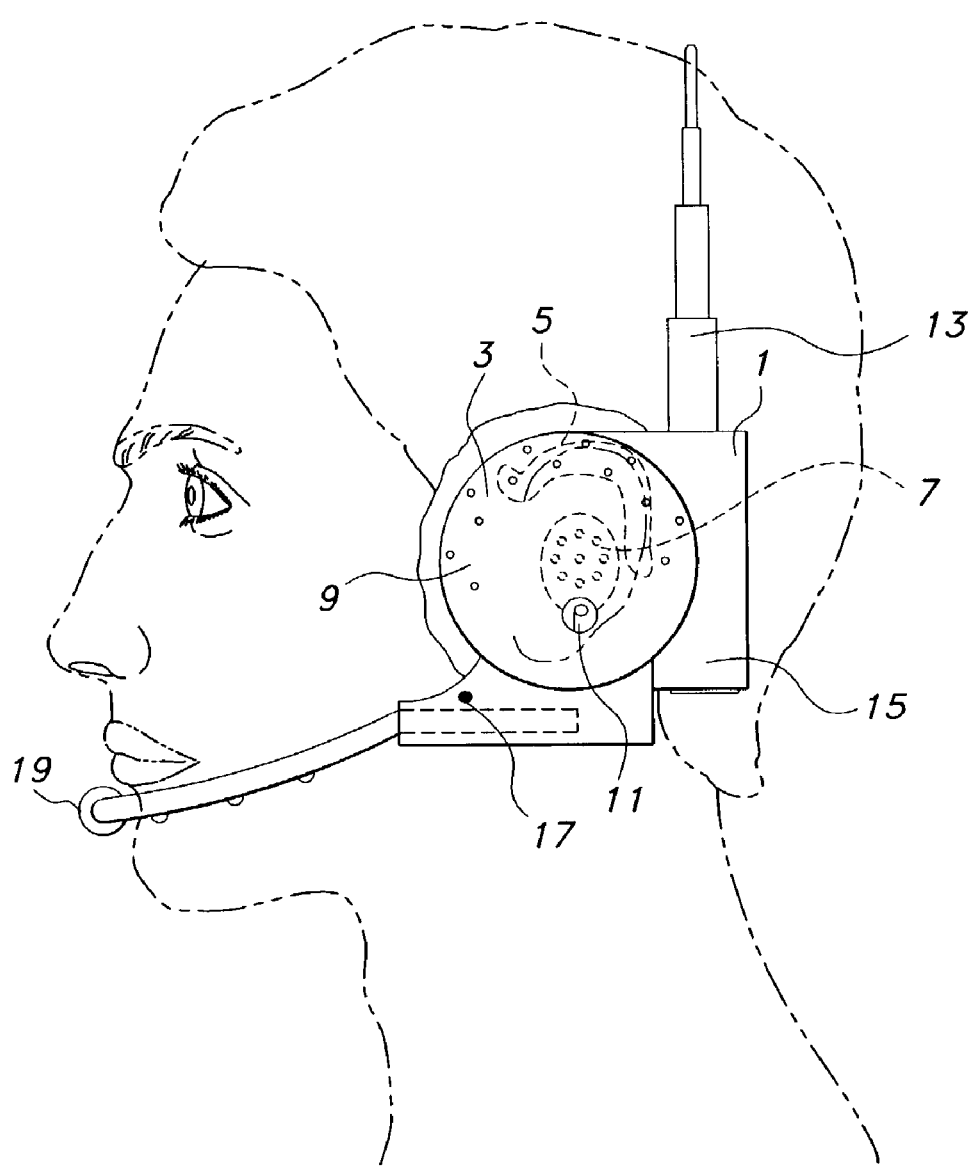
FIG. 2 is a perspective view showing a headset cell phone according to a second embodiment of the present invention.
Figure 3:
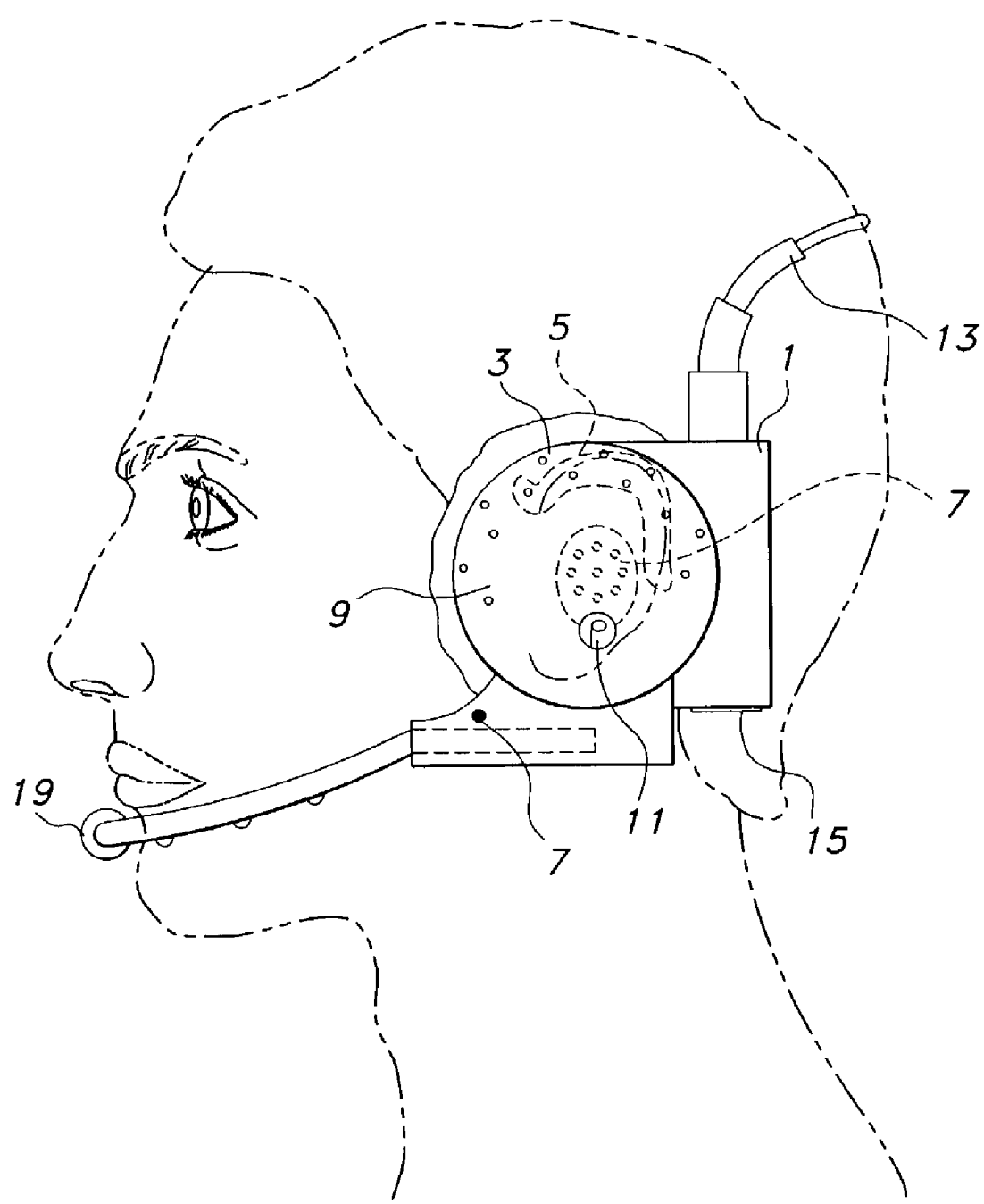
FIG. 3 is a perspective view showing a headset cell phone according to a third embodiment of the present invention.

FIG. 2 shows another embodiment of cell phones according to the present invention in which the strap 13 extends across the top of the head. FIG. 3 shows an embodiment in which the strap 13 extends over the top back portion of the head. Strap 13 may itself be bendable and/or configurable, and it may be mounted on body 1 or other portion of headset in an adjustable fashion such as via swivel connection for maximum flexibility and configurability relative to the anatomy and preferences of the user (such as, for instance to be hidden by or in the hair).

Figure 4:
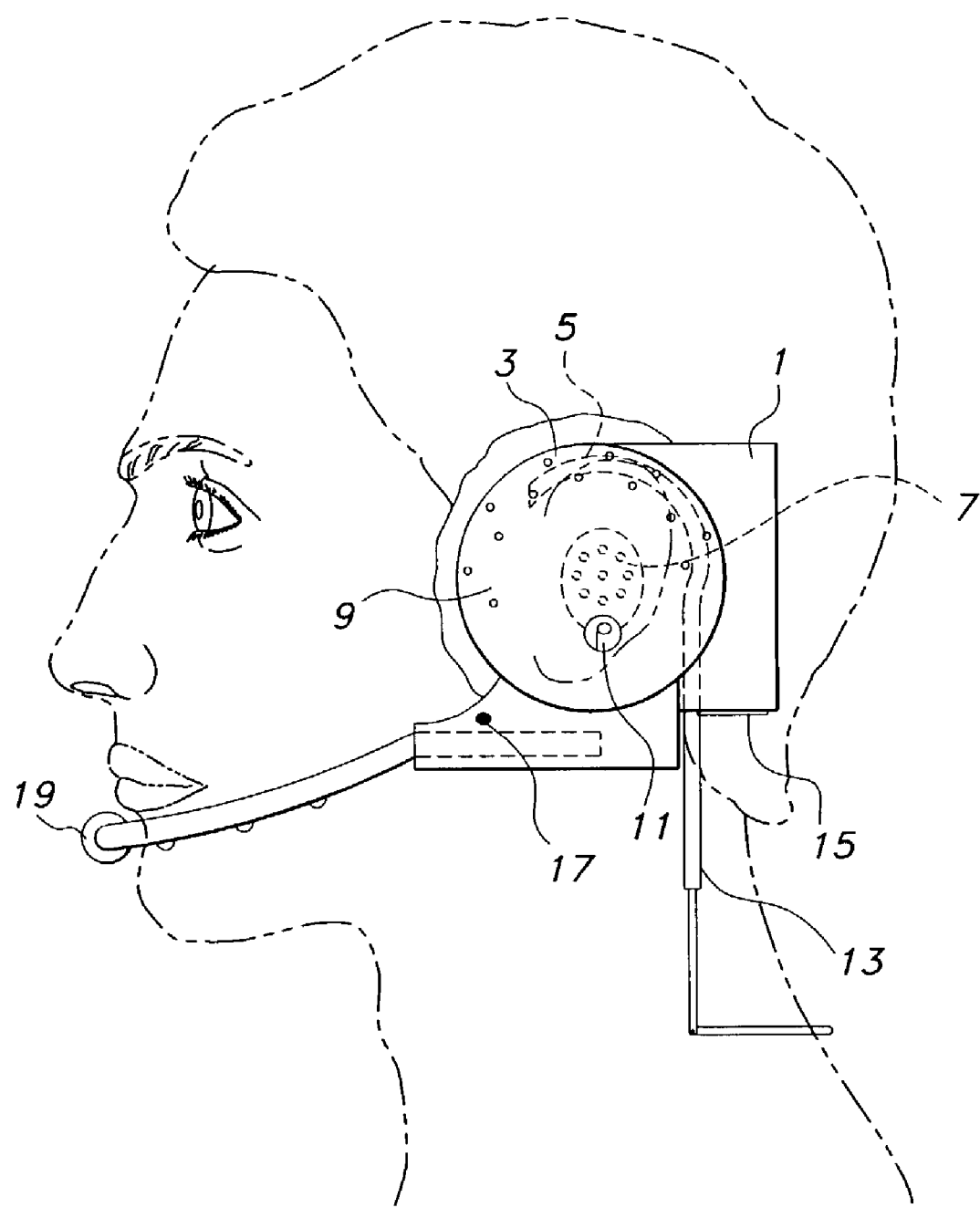
FIG. 4 is a perspective view showing a headset cell phone according to a fourth embodiment of the present invention.

FIG. 4 shows a strap 13 which extends downward along the neck and around the back portion of the lower neck, as another example of a strap 13 which can be adjustable and configurable to support and hold the cell phone comfortably relative to the user's head.

Figure 5:
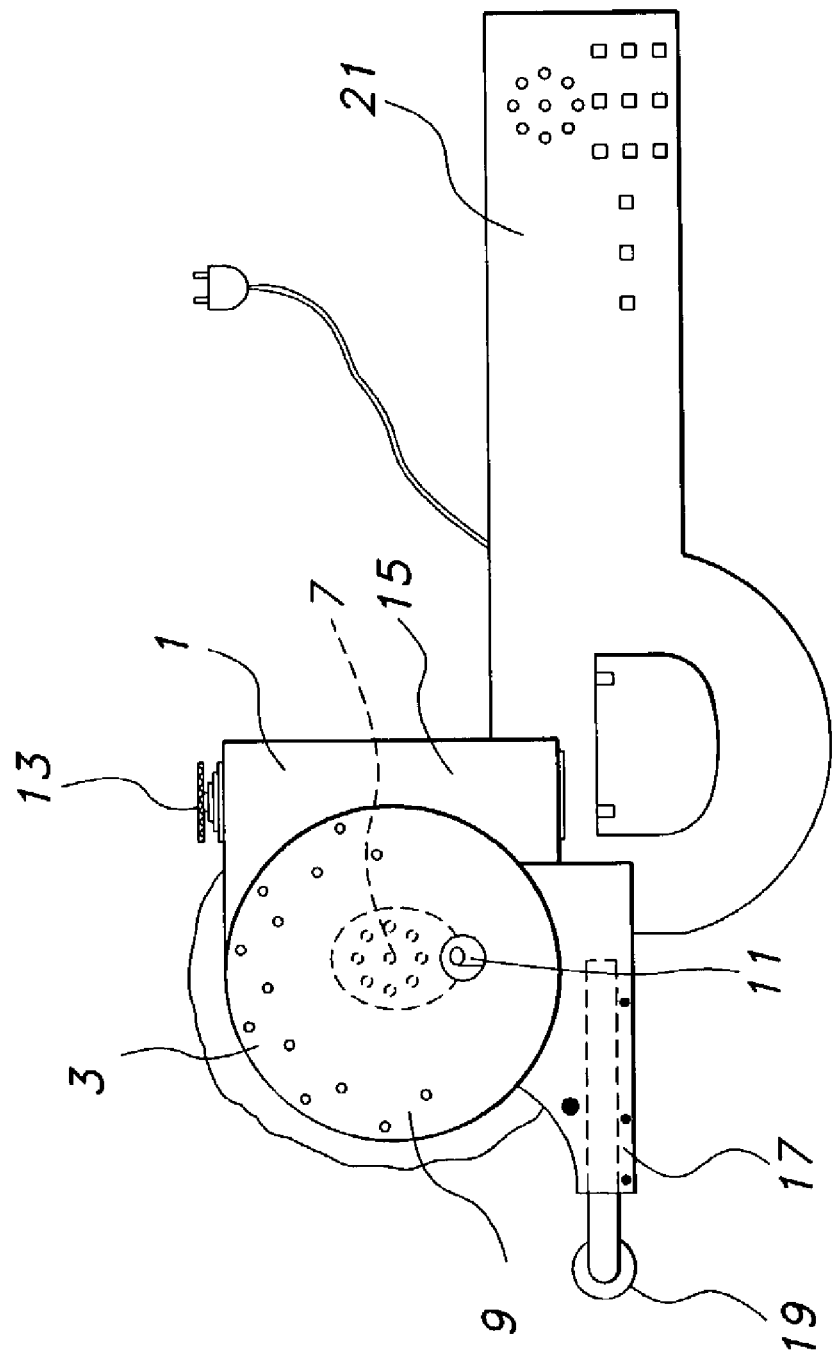
FIG. 5 is a perspective view showing a headset cell phone according to a fifth embodiment of the present invention.

FIG. 5 shows another embodiment of cell phones according to the present invention connected to a base charger 21 which can also serve as a base unit for home wireless operation such as in the 900 megahertz or 2 gigahertz range. In this illustration, the strap 13 has been retracted from a telescoping position (although the strap need not be a telescoping strap in any embodiments of the present invention). The microphone support 17 has also been retracted. In this position, the headset is able to be actuated, controlled, such as for dialing numbers and entering touch tone codes, for example, and to communicate with the user through the external speaker 9.

Figure 6:
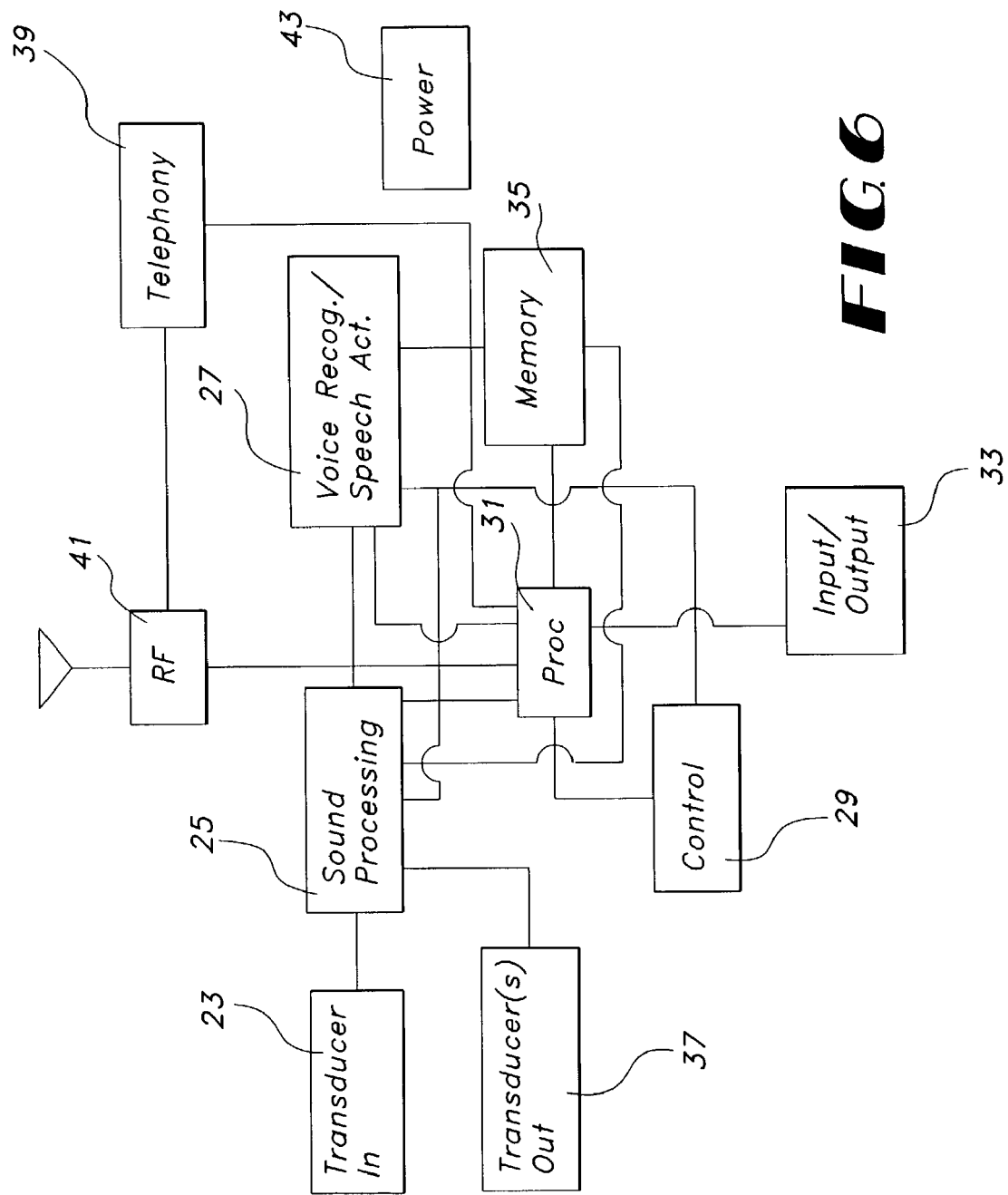
FIG. 6 is a schematic diagram showing electronics which may be used in certain embodiments of cell phones according to the present invention.

FIG. 6 is a schematic diagram which shows aspects of circuitry and functionality which may be used in cell phones according to the present invention. A transducer 23 such as for example internal speaker 7 or external speaker 9 or microphone 19 receives sound from the user's mouth and generates corresponding signals which can be digitized and otherwise processed as necessary in sound processing circuitry 25. Sound processing circuitry 25 is coupled to and can in some implementations be included in voice recognition/speech activation circuitry 27.

Voice recognition/speech activation circuitry 27 circuitry can include processing capability, memory and software to implement or carry out voice and/or speech activation tasks. In other words, circuitry 27 can receive signals corresponding to voice, recognize what those signals mean, and then send signals to other circuitry based on such meaning to carry out, for example tasks like dialing a telephone number, turning the headset on or off, entering touch tones in response to a call tree on the other end of the connection, conferencing in a third party, setting up call forwarding, navigating, downloading and uploading voice mail, entering a date into a calendar, changing the address of a person listed in a contacts list, updating a task list, checking email, and other tasks carried out by telephones, pda's, calendars and similar appliances.

Voice recognition/speech activation circuitry 27 is coupled to control circuitry 29 which can operate in conjunction with processing circuitry 31, input/output circuitry 33, and memory circuitry 35. Circuitry 27 operates with some or all of these to cause the device to respond to voice commands by doing the sorts of tasks mentioned in the paragraph above, among other things, in order to function as a cell phone, home wireless phone, pda, calendar, email facility, among others, using a voice interface as the primary interface to the user with transducers 23 and 37 (which may be the same loudspeaker or other device, or different ones as discussed in other parts of this disclosure).

Telephony circuitry 39 is coupled to other circuits as shown in FIG. 6 in order to allow the device to act and communicate as a cell phone and/or home wireless phone. RF circuits 41 allow the device to communicate over the airwaves with transceivers at cell towers, home base units and other locations. Power circuits 43 supply power as desired to all circuits and components of the device. These circuits 43 can include rechargeable batteries and any other functionality which may be appropriate to allow the device to function for extended periods with maximum features available, but with minimum power drain.

The foregoing has been provided for purposes of disclosure of various embodiments of the present invention. Additions, deletions and modifications may be made to the embodiments disclosed in this document without departing from the scope or spirit of the invention.

What is claimed is:

1. A cellular telephonic device, comprising:
   a body which contains cellular telephone circuitry, a power source, and speech activation circuitry including processing circuitiry, memory circuitry and computer program code stored in said speech activation circuitry;
   an earpiece connected to said body and adapted to be positioned adjacent to the user's ear, said earpiece including an internal speaker for delivering sound to the user's ear, and an external speaker electrically coupled to the internal speaker for allowing the user to hear ambient noise through the internal speaker, and adapted to allow a ring tone to be heard externally of the device; and
   a boom attached to the earpiece, the boom containing a microphone and physically connected to a switch, said switch adapted to be operated by movement of the boom to control operation of said device, said switch including an off position for placing the device in a standby mode, a conversation position, and a third position adapted to place the device in a mode in which said device can be programmed; and
   wherein operation of said external speaker and control of placing the device in an off-hook state and an on-hook state are executed using the speech activation circuitry.

2. The device of claim 1, wherein the body and the earpiece are physically coupled.

3. The device of claim 1, wherein the body further contains radiofrequency circuitry adapted to allow the device to operate as a home wireless telephone.

4. The device of claim 1, wherein the speech activation circuitry controls conferencing in a third party.

5. The device of claim 1, wherein the speech activation circuitry controls setting up call forwarding.

6. The device of claim 1, wherein the speech activation circuitry controls downloading voice mail.

7. The device of claim 1, wherein the speech activation circuitry controls entering a date into a calendar.

8. The device of claim 1, wherein the speech activation circuitry controls changing an address of a person in a contacts list.

9. The device of claim 1, wherein the speech activation circuitry controls checking email.

10. The device of claim 1, wherein a porthole in the earpiece is adapted to be controlled by speech activation circuitry.

* * * * *